United States Patent
Auer et al.

(10) Patent No.: US 6,300,467 B1
(45) Date of Patent: Oct. 9, 2001

(54) PRODUCTION OF POLYTETRAHYDROFURAN WITH TERMINAL HYDROXYL GROUPS BY CHANGING THE CONTINUOUS AND DISPERSED PHASE

(75) Inventors: Heinz Auer, Neulussheim; Jürgen Ciprian, Ludwigshafen; Lothar Franz, Mutterstadt; Wolfgang Franzischka, Frankenthal; Gabriele Iffland, Ludwigshafen; Alexander Weck, Bühlertal; Werner Weinle, Friedelsheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/445,993
(22) PCT Filed: Apr. 15, 1999
(86) PCT No.: PCT/EP99/02545
§ 371 Date: Mar. 29, 2000
§ 102(e) Date: Mar. 29, 2000
(87) PCT Pub. No.: WO99/54382
PCT Pub. Date: Oct. 28, 1999

(30) Foreign Application Priority Data

Apr. 17, 1998 (DE) .............................. 198 17 113

(51) Int. Cl.⁷ ...................................... C08F 6/00
(52) U.S. Cl. .................. 528/489; 528/272; 528/488; 528/496; 528/503
(58) Field of Search ................................... 528/272, 488, 528/489, 496, 503

(56) References Cited

U.S. PATENT DOCUMENTS

| | | | | |
|---|---|---|---|---|
| 4,230,892 | * | 10/1980 | Pruckmayr | 568/617 |
| 5,282,929 | * | 2/1994 | Darai et al. | 203/91 |
| 5,852,218 | * | 12/1998 | Dorai | 568/621 |
| 5,981,688 | * | 11/1999 | Auer et al. | 528/176 |
| 6,037,381 | * | 3/2000 | Beer et al. | 521/28 |

* cited by examiner

*Primary Examiner*—Samuel A. Acquah
(74) *Attorney, Agent, or Firm*—Oblon, Spivak, McClelland, Maier & Neustadt, P.C.

(57) ABSTRACT

The present invention relates to a process for preparing hydroxyl-containing polymers, in particular for preparing polytetrahydrofuran with terminal hydroxyl groups, from the corresponding acyloxy-containing polymers by transesterification with alcohols in the presence of an alkali metal- or alkaline earth metal-containing catalyst, which entails the appropriate acyloxy-containing polymer being introduced together with the alcohol and the catalyst into a first prereactor (I) and converted therein at least partly to the hydroxyl-containing polymer, and the reaction solution being fed into the upper zone (IIa) of a distillation column (II) into whose lower zone (IIb) alcohol in vapor phase is additionally fed. This involves a phase exchange at the coherent and the disperse phase at the transition from the prereactor to the distillation column. Preferably, in addition to the first prereactor, a further 3 prereactors are used which serve as holdup reactors.

9 Claims, 4 Drawing Sheets

PRODUCTION OF POLYTETRAHYDROFURAN WITH TERMINAL HYDROXYL GROUPS BY CHANGING THE CONTINUOUS AND DISPERSED PHASE

The invention relates to a process for preparing hydroxyl-containing polymers, in particular for preparing polytetrahydrofuran with terminal hydroxyl groups, from the corresponding acyloxy-containing polymers by transesterification with alcohols in the presence of an alkali metal- or alkaline earth metal-containing catalyst.

It is known from the prior art to prepare polytetrahydrofuran with terminal hydroxyl groups, referred to as PTHF for short hereinafter, by using cationic catalyst systems from tetrahydrofuran. The first step results in a polytetramethylene ether whose end groups are determined by the initiator system and reaction medium. These end groups in the initially resulting polymer must then be converted into alcohol functionalities. A conventional method used for this is transesterification using lower alcohols and initiated by alkaline catalysts. Sodium methoxide is known to be an effective transesterification catalyst.

If the intention is to carry out this transesterification in a continuous procedure, however, the considerable problem arises that the reaction solution foams greatly, resulting in the downstream column for removing methanol and the methanol/methyl acetate azeotrope no longer being able to perform its separation task owing to the presence of PTHF. The transesterification then proceeds in an uncontrolled fashion because considerable amounts of PTHF which have reacted to various degrees are driven back, so that the transesterification can be carried out only with considerably reduced capacity.

It is an object of the present invention, based on this prior art, to provide a process for preparing hydroxyl-containing polymers and, in particular, for preparing polytetrahydrofuran with terminal hydroxyl groups from the corresponding acyloxy-containing polymers by transesterification with alcohols, which permits continuous transesterification without interfering foam formation.

We have found that this object is achieved by a process in which the appropriate acyloxy-containing polymer is introduced together with the alcohol and the catalyst into a first prereactor and is converted therein at least partly to the hydroxyl-containing polymer, and the reaction solution is fed into the upper zone of a distillation column into whose lower zone alcohol in vapor phase is additionally fed.

The first prereactor means in this connection a reaction vessel in which the acyloxy-containing polymer can be reacted under catalytic conditions with the alcohol to give the hydroxyl-containing polymer and which is upstream of the distillation column.

It is true that WO 97,23559 has disclosed the preparation of polytetrahydrofuran with terminal hydroxyl groups by catalyzed transesterification with alcohols, in which the appropriate acyloxy-containing polymer, the catalyst and the alcohol are fed into the upper zone of a distillation column into whose lower zone alcohol in vapor phase is additionally fed. However, this management of the reaction is unsuitable for suppressing the severe foaming in the reaction solution during the transesterification. The difference from said process is, according to the invention, that the actual transesterification process is carried out essentially not in the distillation column but in the first prereactor. This prereactor acts as holdup vessel for establishing equilibrium for the conversion into the hydroxyl-containing polymers.

Downstream of this first prereactor is the distillation column which serves to strip out the methyl acetate which is formed, for example, in the transesterification, which shifts the reaction equilibrium in the direction toward the transesterified product to be formed in the reaction. Alcohol vapor is fed as stripping gas into the lower zone of the distillation column.

This division of the reaction into two zones, namely the actual transesterification in the first prereactor and the stripping out of the methyl acetate which is formed, for example, in the reaction, surprisingly results in a preparation process free of interference by foam formation.

The difference in the management of the reaction compared with the process disclosed in WO 97/23559 mentioned hereinbefore is that there is provision of a phase exchange of the coherent and disperse phase between the first prereactor on the one hand and the distillation column on the other hand.

In the first prereactor, the liquid represents the coherent phase and the vapor represents the disperse phase. In the distillation column, however, the coherent phase is the vapor in the form of the alcohol in vapor phase which is fed in, and the disperse phase is the liquid fed in the form of a downflowing film into the upper zone of the distillation column from the first prereactor.

When carrying out the process according to the invention, the reacted polymer is advantageously removed from the lower zone of the column after passing through it, while the alcohol vapor passes through the column in essentially the opposite direction. During this it reacts with, for example, the polytetrahydrofuran monoacetate essentially formed in the case of PTHF preparation, again bringing about a shift in the reaction equilibrium toward the wanted reaction product.

It is particularly preferred to connect the distillation column to at least one other prereactor into which is fed the reaction solution which passes through the column and is at least partly converted into the hydroxyl-containing polymer, and which is returned from there, after a predetermined holdup time, to the column.

It is possible to provide in another embodiment of the process according to the invention for each prereactor to have at least one inflow into the column and an outflow from the column, with at least one inflow being disposed so that it opens into the column above the at least one outflow. This management of the reaction achieves optimization of the yield.

It has emerged as particularly advantageous with a view to optimizing the reaction conversion if the distillation column is connected to at least three other prereactors into which is fed successively the reaction solution passing through the column and at least partly converted into the hydroxyl-containing polymer.

The process according to the invention can be used for a reaction employing polytetrahydrofuran diacetate, referred to as PTHF DiAc for short hereinafter, while the abbreviated PTHF means the reacted final product, as acyloxy-containing polymer, methanol as alcohol and sodium methoxide as alkali metal- or alkaline earth metal-containing catalyst. In this reaction, PTHF DiAc reacts in the first prereactor upstream of the column relatively quickly—as shown by kinetic investigations—to give the monoacetate, from which the diol PTHF is then formed.

There is thus transfer of a reaction solution which consists to a large extent of final product which has already been formed and to a smaller extent of the monoacetate and, additionally, methyl acetate, methanol and the catalyst used from the first prereactor into the column. In this case the ratio of final product which has already been formed to the monoacetate resulting as intermediate may vary depending on the degree of polymerization of the PTHF DiAc which is employed for conversion, for example, into PTHF 1000 or PTHF 2000.

It is possible to use a stirred vessel as first or further prereactor. However, a tubular reactor or another comparable reaction container is also suitable. It is possible in this case in particular to operate the first prereactor with separate heating. However, this is not absolutely necessary for carrying out the reaction. In addition, the first prereactor may already have a feed line for methanol vapour in order to introduce the latter into the first prereactor and thus speed up complete conversion to PTHF.

The invention is to be described in detail below with reference to exemplary embodiments depicted in the drawing.

BRIEF DESCRIPTION OF THE DRAWINGS

This shows.

The transesterification of PTHF DiAc using methanol (MeOH) and sodium methoxide as catalyst is described below.

Figure 1:
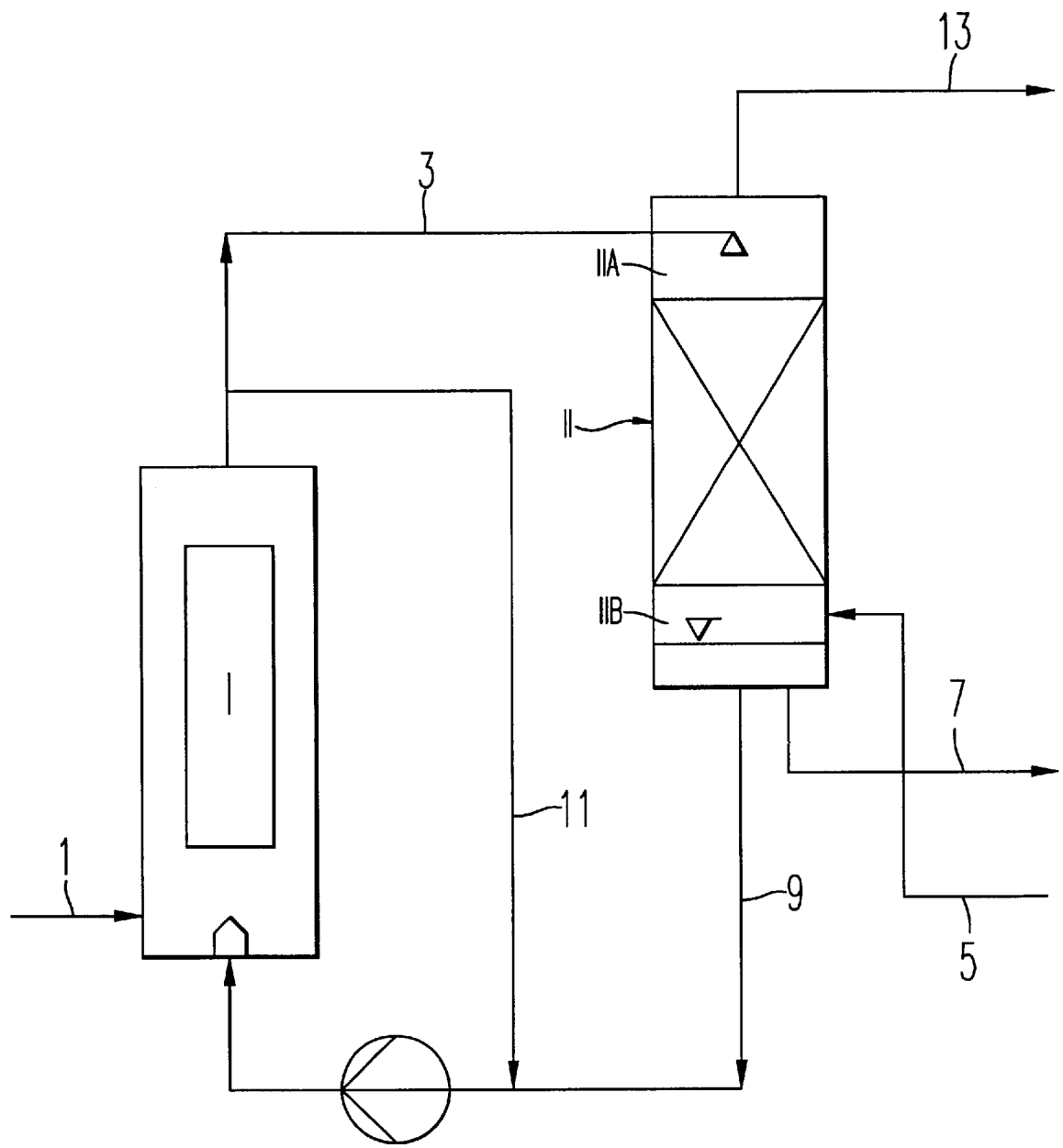
FIG. 1 a schematic diagram of a first embodiment of a polytetrahydrofuran transesterification carried out according to the invention, FIG. 2 a schematic diagram of a second embodiment of a polytetrahydrofuran transesterification carried out according to the invention, FIG. 3 a schematic diagram of a third embodiment of the reaction carried out according to the invention and FIG. 4 a schematic diagram of a fourth embodiment of the reaction carried out according to the invention.

As depicted in FIG. 1, PTHF DiAc, methanol and the sodium methoxide used as catalyst are introduced through line 1 into a first prereactor I. This first prereactor I is, for example, a jet reactor and acts as holdup container for the transesterification reaction.

The reaction itself takes place in two steps, with initial formation of the monoacetate as shown in reaction equation I:

PTHF DiAc+1 MeOH$^{cat.}$PTHF MonoAc+1 MeAc    (I)

The monoacetate then reacts in a second reaction step as shown in reaction equation II to give the required final product:

PTHF MonoAc+1 MeOH$^{cat.}$PTHF+MeAc    (II)

The conversion into PTHF in the first prereactor I initially takes place relatively rapidly to a conversion of about 95%. In order to achieve further, essentially complete, conversion, it is necessary to deliberately disturb the reaction equilibrium.

The reaction mixture from the first prereactor I is fed through line 3 to the upper zone IIa, i.e. essentially the top zone, of a column II. The reaction mixture consists essentially of already completely converted PTHF, PTHF MonoAc, methyl acetate, methanol and the catalyst. The PTHF DiAc originally employed was no longer detectable.

This involves an exchange of the coherent and the disperse phase between prereactor I and the column II. In prereactor I, the liquid is the coherent phase and the vapor is the disperse phase. In column II, however, the coherent phase is the vapor in the form of the alcohol in vapor phase which is fed in, and the disperse phase is the liquid fed in the form of a downflowing film into the upper zone of the column II from the prereactor I. Accordingly, column II has either dumped packings or a structured packing, i.e. random or ordered packings or perforated plates, but not bubble trays or valve trays.

Methanol in vapor phase is additionally fed into the lower zone IIb of column II through line 5. This methanol vapor passes through column II toward the top IIa of the column and thus strips out the methyl acetate formed in the transesterification reaction in accordance with the reaction equation shown above. This shifts the equilibrium toward the transesterified reaction product and improves the conversion into PTHF, which is removed from the lower zone IIb of column II through line 7.

Since column I has random or ordered packings or perforated plates with minimal holdup, the methanol vapor is able to pass through these plates with negligible hindrance. If bubble trays or valve trays are used, there would be a much greater holdup at each tray, and the passage of the methanol vapor would lead to interference from foaming.

At the same time, part of this product stream is fed through line 9 back to the prereactor I. Another line 11 additionally passes reaction solution from line 3, which connects the stirred vessel I to the column II, back to line 9, forming a circuit in order to optimize further the conversion to PTHF by disturbing the reaction equilibrium. Line 13 in the zone of the top IIa of the column is used to remove the methanol/methyl acetate mixture, which is subsequently worked up by distillation to recover methanol.

Figure 2:
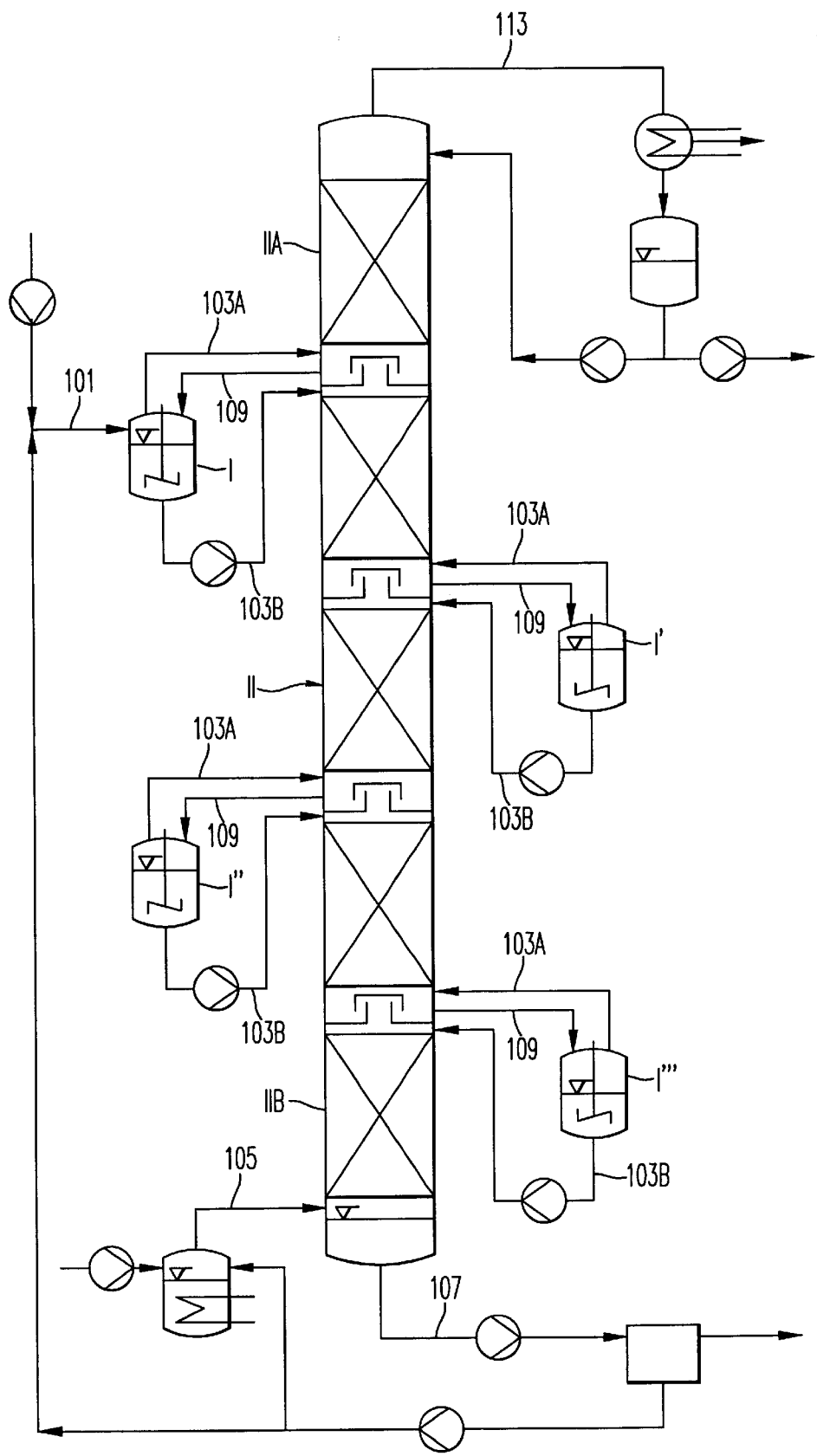

FIG. 2 depicts another embodiment of the process according to the invention. The same structural elements are provided with the same reference numbers but with the addition of 100 by comparison with FIG. 1. The procedure in principle corresponds to that described in relation to FIG. 1.

The distillation column II employed in this embodiment has a metal packing. The number of theoretical stages is about 22. A difference from the first embodiment is the use of 4 stirred vessels I, I', I'', I''', which each have a vapor and vent line 103a and an outflow line 103b to the column II. These stirred vessels I, I', I'', I''' are arranged consecutively starting in the zone at the top IIa of the column, so that reaction solution is passed from the first stirred vessel I, which represents the first prereactor I, through line 103b into column II, passes through the latter toward the base IIb of the column until a feed line 109, which is assigned to the further stirred vessel I', is reached via a baffle, and the reaction solution flows through this line into the stirred vessel I' as further holdup container to achieve complete conversion to PTHF due to further deliberate disturbance of the reaction equilibrium.

This procedure is repeated correspondingly for the other stirred vessels I'' and I'''. It should be pointed out in this connection that an arrangement of 2, 3 or more than 4 stirred vessels also achieve the results according to the invention, so that the arrangement of one or 4 stirred vessels in the exemplary embodiments described herein is by way of example.

The references to feed line 109 and outflow line 103b relate to each stirred vessel. Accordingly, reaction solution is fed into each stirred vessel through line 109 and flows out through line 103b toward the column.

The methanol vapor is fed through line 105 into the zone at the bottom of the column and is removed together with the entrained MeAc through line 113 in the zone at the top IIa of the column.

Figure 3:
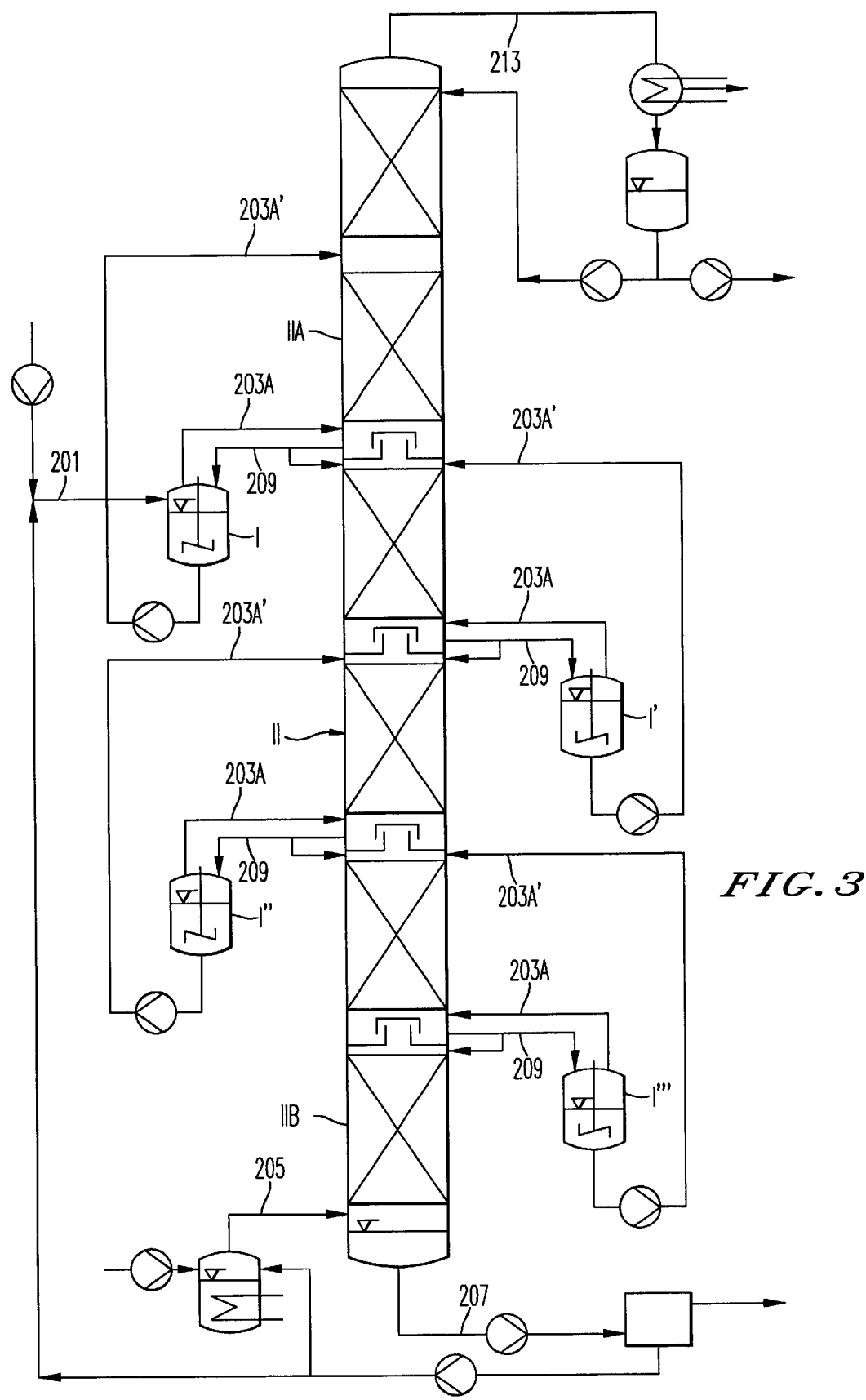

A further embodiment of the process according to the invention is depicted in FIG. 3. Once again, the same structural elements are provided with the same reference numbers but with the addition of 200 by comparison with FIG. 1.

The management of the process depicted in FIG. 3 differs from that in FIG. 2 in that the outflow line 203a' is arranged so that it opens into the column II above the respective inflow line 209. Therefore no outflow line corresponding to the outflow line 103b in the second embodiment is provided when the process is managed in accordance with this embodiment. It is beneficial that, on passing through the column, part of the reaction solution is able to recirculate once again in each of the stirred vessels I, I', I" and I'" themselves before it enters the next vessel, resulting in an increase in the holdup time and thus a further improvement in the conversion. At the same time, on passing through the column, MeAc formed in the reaction which has already taken place is removed by means of the stripping gas methanol, and thus the reaction equilibrium is beneficially influenced toward the required transesterified reaction product.

The number of theoretical plates in distillation column II is 27. In this connection, the number of packings in distillation column II is was increased to ensure that the outflow line 203a' is connected to column II in such a way that the reaction solution is able to pass once again through a whole packing unit in column II before it reaches the particular inflow line 209 of the particular stirred vessel I, I', I", I'" in which it was previously held up.

Figure 4:
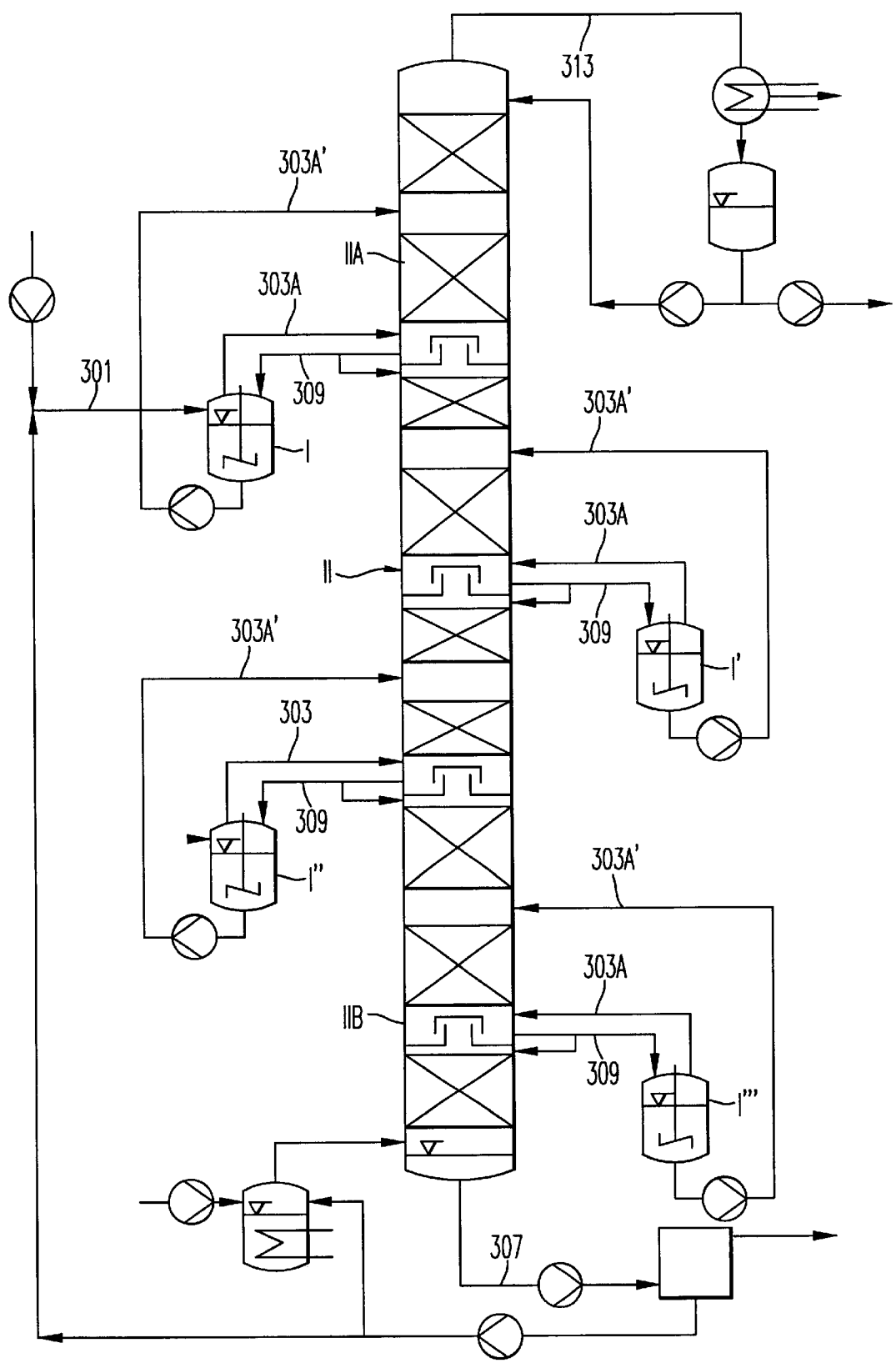

FIG. 4 depicts yet another embodiment of the process according to the invention. Identical structural elements are once again provided here with the same reference numbers but increased by 300 in comparison with FIG. 1. The procedure in principle once again corresponds to that described above.

FIG. 4 differs from the embodiment depicted in FIG. 3 in that there is use of a distillation column II in which the number of theoretical stages is 40 in order thus to optimize the management of the reaction farther. Whereas in the embodiment depicted in FIG. 3 the feed line 209 from the preceding stirred vessel in each case opened into column II in approximately the same zone as the outflow line 203a' of the following stirred vessel in each case, the increase in the number of theoretical stages in this fourth embodiment results in a further packing unit being now arranged also between the feed line 309 of the preceding stirred vessel and outflow line 303a' of the following stirred vessel.

The openings of the feed line 309 and the outflow line 303a' into the column II are therefore arranged so that, for example, an upper outflow line 303a' is provided for stirred vessel I and the opening thereof into column II is separated in the direction toward the bottom IIb of the column by a packing unit from the feed line 309 for stirred vessel I, and another packing unit is located between the opening of the feed line 309 of stirred vessel I and the following upper outflow line 303a' of the next stirred vessel I'.

We claim:

1. A process for preparing hydroxyl-containing polymers, from the corresponding acyloxy-containing polymers by transesterification with alcohols in the presence of an alkali metal- or alkaline earth metal-containing catalyst, which compromises introducing the appropriate acyloxy-containing polymer together with the alcohol and the catalyst into a first prereactor (I) and being converted therein at least partly to the hydroxyl-containing polymer, and feeding the reaction solution into the upper zone (IIa) of a distillation column (II) into whose lower zone (IIb) alcohol in vapor phase is additionally fed.

2. The process as claimed in claim 1, wherein the reacted polymer is removed from the lower zone (IIb) of the column (II) after passing through it, and the alcohol vapor passes through the column (II) in essentially the opposite direction.

3. The process as claimed in claim 1, wherein the column (II) is connected to at least one other prereactor (I') into which is fed the reaction solution which passes through the column (II) and is at least partly converted into the hydroxyl-containing polymer, and which is returned from there, after a predetermined holdup time, to the column (II).

4. The process as claimed in claim 1, wherein each prereactor (I; I'; I"; I'") has at least one inflow (203a', 303a') into the column (II) and an outflow (209; 309) from the column (II), with at least one inflow (203a', 303a') being disposed so that it opens into the column (II) above the at least one outflow (209; 309).

5. The process as claimed in claim 3, wherein the column (II) is connected to three other prereactors (I'; I"; I'") into which is fed successively the reaction solution passing through the column (II) and at least partly converted into the hydroxyl-containing polymer.

6. The process as claimed in claim 1, wherein the hydroxyl-containing polymer produced is polytetrahydrofuran with terminal hydroxy groups.

7. The process as claimed in claim 1, wherein the acyloxy-containing polymer is polytetrahydrofuran diacetate, the alcohol is methanol, and the alkali metal-containing catalyst is sodium methoxide.

8. The process as claimed in claim 1, wherein the prereactor is a stirred vessel.

9. The process as claimed in calim 1, wherein the prereactor is a tubular reactor.

* * * * *